(12) United States Patent
Watanabe

(10) Patent No.: US 8,211,474 B2
(45) Date of Patent: Jul. 3, 2012

(54) GRANULE COATED WITH URETHANE RESIN

(75) Inventor: Atsushi Watanabe, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 254 days.

(21) Appl. No.: 12/671,225

(22) PCT Filed: Aug. 13, 2007

(86) PCT No.: PCT/JP2007/066065
§ 371 (c)(1),
(2), (4) Date: Jan. 29, 2010

(87) PCT Pub. No.: WO2009/022432
PCT Pub. Date: Feb. 19, 2009

(65) Prior Publication Data
US 2010/0189799 A1    Jul. 29, 2010

(51) Int. Cl.
*B23B 5/16* (2006.01)
(52) U.S. Cl. .......... 424/497; 428/407; 428/403; 528/64; 528/66; 528/86
(58) Field of Classification Search .................. None
See application file for complete search history.

(56) References Cited

U.S. PATENT DOCUMENTS

| | | | | |
|---|---|---|---|---|
| 5,028,648 | A * | 7/1991 | Famili et al. | 524/317 |
| 5,496,496 | A * | 3/1996 | Kajita et al. | 252/182.24 |
| 5,803,946 | A | 9/1998 | Petcavich et al. | |
| 6,023,547 | A * | 2/2000 | Tortorello | 385/114 |
| 7,220,469 | B2 * | 5/2007 | Sakane et al. | 428/32.66 |
| 2003/0125499 | A1* | 7/2003 | Benz et al. | 528/44 |
| 2005/0031871 | A1* | 2/2005 | Kinsho et al. | 428/402 |
| 2010/0151250 | A1* | 6/2010 | Watanabe | 428/407 |
| 2010/0196431 | A1* | 8/2010 | Watanabe et al. | 424/419 |

FOREIGN PATENT DOCUMENTS

| | | |
|---|---|---|
| JP | 07-000505 A | 6/1991 |
| JP | 2916762 A | 2/1998 |
| JP | 11005704 A | 1/1999 |
| JP | 11130576 A | 5/1999 |
| JP | 2003183104 A | 7/2003 |
| JP | 2007210960 A | 8/2007 |
| WO | 9748664 A1 | 12/1997 |

OTHER PUBLICATIONS

International Preliminary Report on Patentability for related International Application No. PCT/JP2007/066065 dated Feb. 16, 2010.
Int'l Search Report issued on May 8, 2008 in Int'l Application No. PCT/JP2007/066065.

* cited by examiner

*Primary Examiner* — Robert A Wax
*Assistant Examiner* — Jeffrey T Palenik
(74) *Attorney, Agent, or Firm* — Panitch Schwarze Belisario & Nadel LLP

(57) ABSTRACT

A coated granule obtained by coating a bioactive substance-containing granule with a urethane resin obtained by reaction of an aromatic polyisocyanate with an alcohol mixture comprising a polyesterpolyol having 15 wt % or more of an oxycarbonyl structure (—O—C(═O)—) part in the molecule and a C4-C30 alkanol optionally substituted by one or more aryl groups, wherein the molar ratio of the polyesterpolyol to the alkanol is 1:1 to 100:1, is capable of controlling elution of the bioactive substance appropriately, and, the urethane resin forming the coat film shows degradability in soil.

11 Claims, No Drawings

GRANULE COATED WITH URETHANE RESIN

CROSS-REFERENCE TO RELATED APPLICATION

This application is a section 371 of International Application No. PCT/JP2007/066065, filed Aug. 13, 2007 and the disclosure of which is incorporated herein by reference.

TECHNICAL FIELD

The present invention relates to a granule coated with a urethane resin.

BACKGROUND TECHNOLOGY

There is suggested a technology of coating a bioactive ingredient for fertilizers, pesticides and the like with a coat film, thereby controlling elution appropriately, so as to cause elution thereof at given period according to the growth of plants.

Recently, enhanced attention is paid to easily degradable resins for thoughtful consideration for the environment. JP 11-130576A and JP 7-505B disclose granules coated with polycaprolactone and polyethylene or the like. With coated granules of fertilizers, however, it is difficult to control elution using an easily degradable resin as a coat film so as to elute a fertilizer component at given period.

DISCLOSURE OF THE INVENTION

According to the present invention, with a coated granule of a bioactive substance, use of a urethane resin obtained by reacting an aromatic polyisocyanate with an alcohol mixture comprising a polyesterpolyol having 15 wt % or more of an oxycarbonyl structure (—O—C(=O)—) part in the molecule and a C4-C30 alkanol optionally substituted by one or more aryl groups, wherein the molar ratio of the polyesterpolyol to the alkanol is 1:1 to 100:1.

That is, the present invention includes the following inventions.

[Invention 1]
A coated granule obtained by coating a bioactive substance-containing granule with a urethane resin obtained by reaction of an aromatic polyisocyanate with an alcohol mixture comprising a polyesterpolyol having 15 wt % or more of an oxycarbonyl structure (—O—C(=O)—) part in the molecule and a C4-C30 alkanol optionally substituted by one or more aryl groups, wherein the molar ratio of the polyesterpolyol to the alkanol is 1:1 to 100:1. The molar ratio of the polyesterpolyol to the alkanol means a ratio of the number of the hydroxyl group of the polyesterpolyol to the number of the hydroxyl group of the alkanol throughout the description.

[Invention 2]
The coated granule described in Invention 1, wherein the amount of the polyesterpolyol is 20 to 80 parts by weight based on 100 parts by weight of the total amount of the aromatic polyisocyanate and the alcohol mixture.

[Invention 3]
The coated granule described in Invention 1 or 2, wherein the polyesterpolyol is polycaprolactonepolyol.

[Invention 4]
The coated granule described in Invention 3, wherein the amount of the polycaprolactonepolyol is 30 to 80 parts by weight based on 100 parts by weight of the total amount of the aromatic polyisocyanate and the alcohol mixture.

[Invention 5]
The coated granule described in any one of Inventions 1 to 4, wherein the amount of the C4-C30 alkanol optionally substituted by one or more aryl groups is 1 to 30 parts by weight based on 100 parts by weight of the total amount of the aromatic polyisocyanate and the alcohol mixture.

[Invention 6]
The coated granule described in any one of Inventions 1 to 5, wherein the C4-C30 alkanol optionally substituted by one or more aryl groups is a C4-C18 n-alkan-1-ol.

[Invention 7]
The coated granule described in any one of Inventions 1 to 5, wherein the C4-C30 alkanol optionally substituted by one or more aryl groups is 1-butanol, 1-hexanol, 1-octanol, 1-dodecanol, 2-octyl-1-dodecanol, benzyl alcohol or a mixture thereof.

[Invention 8]
The coated granule described in any one of Inventions 1 to 7, wherein the amount of the aromatic polyisocyanate is 5 to 45 parts by weight based on 100 parts by weight of the total amount of the aromatic polyisocyanate and the alcohol mixture.

[Invention 9]
The coated granule described in any one of Inventions 1 to 8, wherein the aromatic polyisocyanate is 4,4'-diphenylmethanediisocyanate or polymethylenepolyphenyl polyisocyanate.

[Invention 10]
The coated granule described in any one of Inventions 1 to 8, wherein the bioactive substance is a fertilizer.

[Invention 11]
The coated granule described in any one of Inventions 1 to 8, wherein the bioactive substance is a pesticide.

DETAILED DESCRIPTION OF THE INVENTION

According to the present invention, the coated granule containing a bioactive substance is coated with a resin easily degradable in soil and shows excellent elution controllability of the bioactive substance.

The urethane resin used as a film for providing the coated granular material of the present invention is a urethane resin obtained by reaction of an aromatic polyisocyanate with an alcohol mixture comprising a polyesterpolyol and a C4-C30 alkanol optionally substituted by one or more aryl groups. The polyesterpolyol has 15 wt % or more of an oxycarbonyl structure (—O—C(=O)—) part in the molecule. The molar ratio of the polyesterpolyol to the alkanol is 1:1 to 100:1.

Preferable polyesterpolyol is polylactonepolyol, which means a compound produced by ring-opening-polymerizing a lactone monomer with a low molecular weight polyol. Examples of the lactone monomer include β-propiolactone, γ-butyrolactone, δ-valerolactone and ε-caprolactone. Examples of the low molecular weight polyol include divalent alcohol such as ethylene glycol, diethylene glycol, propylene glycol, 1,4-butanediol, 1,5-pentanediol, 1,6-hexanediol and 1,8-octanediol; and trivalent alcohol such as 2-ethyl-2-(hydroxymethyl)-1,3-propanediol(trimethylolpropane), 2-(hydroxymethyl)-1,3-propanediol, glycerin and triethanolamine.

Preferable polyesterpolyol is polycaprolactonepolyol, which is a compound produced by ring-opening-polymerizing an ε-caprolactone monomer with the above-mentioned low molecular weight polyol. Typical chemical structures of the polycaprolactonepolyol (polycaprolactonediol or polycaprolactonetriol) having two or three hydroxyl groups in one molecule are shown below. This polycaprolactonepolyol is a polyol having at least one (1-oxohexa-1,6-diyl)oxy structure (—C(=O)—CH$_2$—CH$_2$—CH$_2$—CH$_2$—CH$_2$—O—) in one molecule.

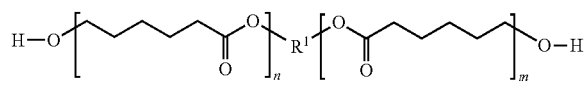

[wherein, m represents an integer of 0 or more, n represents an integer of 1 or more and m+n is 2 or more, and R$^1$ represents a divalent organic group (for example, ethylene group, tetramethylene group and the like)].

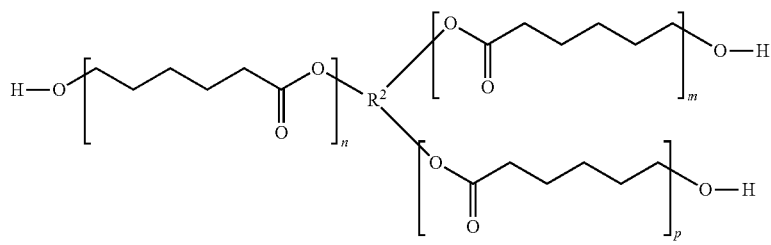

[wherein, m and p represent an integer of 0 or more, n represents an integer of 1 or more and m+n+p is 2 or more, and R$^2$ represents a trivalent organic group (for example, propane-1,2,3-triyl group and the like)].

For example, a polycaprolactonepolyol produced by ring-opening-polymerizing 6 moles of ε-caprolactone with one mole of ethylene glycol has the following formula:

HO—[CH$_2$—CH$_2$—CH$_2$—CH$_2$—CH$_2$—C(=O)—O]$_3$—CH$_2$—CH$_2$—[O—C(=O)—CH$_2$—CH$_2$—CH$_2$—CH$_2$—CH$_2$]$_3$—OH

The polycaprolactonepolyol has about 35 wt % of an oxycarbonyl structure (—O—C(=O)—) part in the molecule, namely, (44×6)/(62+114×6)=0.354 wherein, each molecular weight of ε-caprolactone and ethylene glycol is 114 and 62, respectively, and the oxycarbonyl structure has 44 of the molecular weight.

Further, the equivalent weight of the hydroxyl group to the polycaprolactonepolyol is 373, namely, (62+114×6)/2=373 wherein, the molecular weight of the ε-caprolactone is divided by the number of the hydroxyl group.

The molecular weight of the polycaprolactonepolyol is preferably 300 to 5000, more preferably 400 to 2500. Further, the equivalent weight of the hydroxyl group to the polycaprolactonepolyol is usually 200 to 1250.

Another typical polyesterpolyol is a polyesterpolyol obtained by condensing polymerization of a diol with a dicarboxylic acid. Examples of the diol include ethylene glycol, 1,3-propanediol and 1,4-butanediol, and examples of the dicarboxylic acid include succinic acid, glutaric acid, adipic acid, pimelic acid, suberic acid, azelaic acid, sebacic acid, decanedicarboxylic acid and cyclohexanedicarboxylic acid.

The amount of the polyesterpolyol is usually 10 to 90 parts by weight, preferably 20 to 80 parts by weight, based on 100 parts by weight of the total amount of the aromatic polyisocyanate and the alcohol mixture.

The C4-C30 alkanol optionally substituted by one or more aryl groups include a C4-C30 alkanol, an alkanol substituted by one or more aryl groups (e.g., phenyl, tolyl, xylyl, naphthyl, methylnaphthyl) having 4 to 30 of the total carbon number, and a mixture thereof. Among them, a C4-C18 n-alkan-1-ol is preferable. Further, 1-butanol, 1-hexanol, 1-octanol, 1-dodecanol, 2-octyl-1-dodecanol, benzyl alcohol and a mixture thereof are also preferable. The amount of the C4-C30 alkanol optionally substituted by one or more aryl groups is usually 1 to 30 parts by weight based on 100 parts by weight of the total amount of the aromatic polyisocyanate and the alcohol mixture. The amount of the alkanol is usually set for making the equivalent ratio of the OH group in the alkanol to NCO group in the aromatic polyisocyanate 1:0.01-1:0.4.

Examples of the aromatic polyisocyanate include 4,4'-diphenylmethane diisocyanate (MDI), tolylene diisocyanate (TDI), xylylene diisocyanate (XDI), tolidine diisocyanate (TODI), naphthalene 1,5-diisocyanate (NM), tetramethylenexylylene diisocyanate (TMXDI), polymethylenepolyphenyl polyisocyanate (polymeric MDI) and derivatives thereof (e.g., modified substances such as isocyanurate, biuret and urethodione). Among them, MDI, TODI and polymeric MDI are preferable. The amount of the aromatic polyisocyanate is usually 5 to 45 parts by weight based on 100 parts by weight of the total amount of the aromatic polyisocyanate and the alcohol mixture.

In the present invention, the molar ratio of the isocyanate (NCO) group in the aromatic polyisocyanate to the hydroxyl (OH) group in the polyol mixture is generally 1:0.9-1:1.5, preferably 1:1-1:1.2.

The urethane resin is produced usually by reacting the aromatic polyisocyanate and the alcohol mixture, if necessary in the presence of a catalyst, on the surface of a bioactive substance-containing granule or on a coat film covering a bioactive substance-containing granule.

The reaction of the aromatic polyisocyanate and the alcohol mixture is not particularly restricted, and can be carried out by, for example, a method in which all aromatic polyisocyanates and alcohol mixture are mixed and hardened. Further, it is also possible that a small amount of organic solvent is mixed with a polyisocyanate and alcohol mixture, and a solvent is removed simultaneously with the reaction. The reaction conditions thereof can be selected arbitrarily, however, when the temperature is raised, the reaction speed of a hydroxyl group and an isocyanate group increases. By adding a catalyst, the reaction speed can be accelerated.

Examples of the catalyst to be used for production of a urethane resin include organometal compounds such as potassium acetate, calcium acetate, stannous octoate, dibutyltin diacetate, dibutyltin dichloride, dibutyltin dilaurate, dibutinthiostannic acid, stannous octylate, di-n-octyltin dilaurate, isopropyl titanate, bismuth 2-ethyl hexanoate, phosphine, zinc neodecanoate, tetrabutyl titanate, oxyisopropyl vanadate, n-propyl zirconate and the like, and amine catalysts such as triethylamine, N,N,N',N'-tetramethylethyl-enediamine, triethylenediamine, N-methylmorpholine, N,N-dimethyldidodecylamine, N-dodecylmorpholine, N,N-dimethylcyclohexylamine, N-ethylmorpholine, dimethylethanolamine, N,N-dimethylbenzylamine, 2,4,6-tris(dimethylaminomethyl)phenol and the like.

A mixture having flowability of an aromatic polyisocyanate and alcohol mixture (further, catalyst to be added if necessary), before sufficient reaction of the aromatic polyisocyanate and the hydroxyl group in the alcohol mixture, is expressed as an unhardened urethane resin in some cases.

The coated granule of the present invention is a coated granule obtained by coating a bioactive substance-containing granule with a urethane resin, and the coat using a urethane resin suppresses elution of a bioactive substance in the bioactive substance-containing granule. In the present invention, mentioned as the bioactive substance contained in the bioactive substance-containing granule are insecticides, fungicides, herbicides, plant growth regulating agents, repellents, fertilizers and the like.

Examples of the pesticidal ingredient for insecticides, fungicides, herbicides, plant growth regulating agents, repellents and the like include organophosphorus compounds such as fenitrothion[O,O-dimethyl O-(3-methyl-4-nitrophenyl) phosphorothioate], fenthion[O,O-dimethyl O-(3-methyl-4-(methylyhio)phenyl)phosphorothioate], diazinon[O,O-diethyl O-2-isopropyl-6-methylpyrimidin-4-yl phosphorothioate], chlorpyrifos[O,O-diethyl O-3,5,6-trichloro-2-pyridyl phosphorothioate], acephate[O,S-dimethyl acetylphosphoramidothioate], methidathion[S-2,3-dihydro-5-methoxy-2-oxo-1,3,4-thiadiazol-3-ylmethyl O,O-dimethyl phosphorodithioate], disulfoton[O,O-diethyl S-2-ethylthioethyl phosphorodithioate], DDVP[2,2-dichlorovinyl dimethylphosphate], sulprofos[O-ethyl O-4-(methylyhio)phenyl S-propylphosphorodithioate], cyanophos[O-4-cyanophenyl O-dimethyl phosphorothioate], dioxabenzofos[2-methoxy-4H-1,3,2-benzodioxaphosphorine-2-sulfide], dimethoate[O,O-dimethyl S—(N-methylcarbamoylmethyl)dithiophosphate], phenthoate[ethyl 2-dimethoxyphosphinothioyl(phenyl)acetate], malathion[diethyl(dimethoxyphosphinothioylthio)succinate], trichlorfon [dimethyl 2,2,2-trichloro-1-hydroxyethylphosphonate], azinphos-methyl[S-3,4-dihydro-4-oxo-1,2,3-benzotriazin-3-ylmethyl O,O-dimethylphosphorodithioate], monocrotophos[dimethyl(E)-1-methyl-2-(methylcarbamoyl)vinyl phosphate] and ethion[O,O,O',O'-tetraethyl S,S'-methylenebis(phosphorodithioate)]; carbamate compounds such as BPMC [2-sec-butylphenylmethylcarbamate], benfuracarb [ethyl N-{2,3-dihydro-2,2-dimethylbenzofuran-7-yloxycarbonyl(methyl)aminothio}-N-isopropyl-β-alaninate], propoxur[2-isopropoxyphenyl N-methylcarbamate], carbosulfan[2,3-dihydro-2,2-dimethyl-7-benzo[b]furanyl N-dibutylaminothio-N-methylcarbamate], carbaryl[1-naphthyl N-methylcarbamate], methomyl[S-methyl-N-(methylcarbamoyloxy)thioacetimidate], ethiofencarb[2-(ethylthiomethyl)phenyl methylcarbamate], aldicarb[2-methyl-2-(methylthio)propionaldehyde O-methylcarbamoyl oxime], oxamyl[N,N-dimethyl-2-methylcarbamoyloxyimino-2-(methylthio)acetamide] and fenothiocarb[S-4-phenoxybutyl N,N-dimethylthiocarbamate]; pyrethroid compounds such as etofenprox[2-(4-ethoxyphenyl)-2-methyl-1-(3-phenoxybenzyl)oxypropane], fenvalerate[(RS)-α-cyano-(3-phenoxybenzyl)(RS)-2-(4-chlorophenyl)-3-methylbutyrate], esfenvalerate[(S)-α-cyano-(3-phenoxybenzyl)(S)-2-(4-chlorophenyl)-3-methylbutyrate], fenpropathrin[(RS)-α-cyano-(3-phenoxybenzyl)2,2,3,3-tetramethykyclopropanecarboxylate], cypermethrin [(RS)-α-cyano-(3-phenoxybenzyl)(1RS)-cis,trans-3-(2,2-dichlorovinyl)-2,2-dimethylcyclopropanecarboxylate], permethrin[3-phenoxybenzyl(1RS)-cis,trans-3-(2,2-dichlorovinyl)-2,2-dimethylcyclopropanecarboxylate], cyhalothrin [(RS)-α-cyano-(3-phenoxybenzyl)(1RS,3Z)-cis-3-(2-chloro-3,3,3-trifluoroprop-1-enyl)-2,2-dimethylcyclopropanecarboxylate], deltamethrin[(S)-α-cyano-3-phenoxybenzyl(1R)-cis-3-(2,2-dibromovinyl)-2,2-dimethylcyclopropanecarboxylate], cycloprothrin[(RS)-α-cyano-3-phenoxybenzyl(RS)-2,2-dichlorovinyl-1-(4-ethoxyphenyl)cyclopropanecarboxylate], fluvalinate[α-cyano-3-phenoxybenzyl N-(2-chloro-α,α,α-trifluoro-p-tolyl)-D-valinate], biphenthrin[2-methyl-3-phenylbenzyl (1RS,3Z)-cis-3-(2-chloro-3,3,3-trifluoro-1-propenyl)-2,2-dimethylcyclopropanecarboxylate], halfenprox[2-(4-bromodifluoromethoxyphenyl)-2-methyl-1-(3-phenoxybenzyl)methylpropane], tralomethrin[(S)-α-cyano-3-phenoxybenzyl(1R)-cis-3-(1,2,2,2-tetrabromoethyl)-2,2-dimethylcyclopropanecarboxylate], silafluofen[(4-ethoxyphenyl)-{3-(4-fluoro-3-phenoxyphenyl)propyl}dimethylsilane], d-phenothrin[3-phenoxybenzyl (1R)-cis,trans-2,2-dimethyl-3-(2-methyl-1-propenyl) cyclopropanecarboxylate], cyphenothrin[(RS)-α-cyano-3-phenoxybenzyl(1R)-cis,trans-2,2-dimethyl-3-(2-methyl-1-propenyl)cyclopropanecarboxylate], d-resmethrin[5-benzyl-3-furylmethyl(1R)-cis,trans-2,2-dimethyl-3-(2-methyl-1-propenypcyclopropanecarboxylate], acrinathrin[(S)-α-cyano-3-phenoxybenzyl(1R,3Z)-cis-2,2-dimethyl-3-{3-oxo-(1,1,1,3,3,3-hexafluoropropyloxy) propenyl}cyclopropanecarboxylate], cyfluthrin[(RS)-α-cyano-4-fluoro-3-phenoxybenzyl 3-(2,2-dichlorovinyl)-2,2-dimethylcyclopropanecarboxylate], tefluthrin[2,3,5,6-tetrafluoro-4-methylbenzyl(1RS,3Z)-cis-3-(2-chloro-3,3,3-trifluoro-1-propenyl)-2,2-dimethylcyclopropanecarboxylate], transfluthrin[2,3,5,6-tetrafluorobenzyl(1R)-trans-3-(2,2-dichlorovinyl)-2,2-dimethylcyclopropanecarboxylate], tetramethrin[3,4,5,6-tetrahydrophthalimidomethyl(1RS)-cis,trans-2,2-dimethyl-3-(2-methyl-1-propenyl)cyclopropanecarboxylate], allethrin [(RS)-2-methyl-4-oxo -3-(2-propenyl)-2-cyclopenten-1-yl (1RS)-cis,trans-2,2-dimethyl-3-(2-methyl-1-propenypcyclopropanecarboxylate], prallethrin[(S)-2-methyl-4-oxo-3-(2-propynyl)-2-cyclopenten-1-yl(1R)-cis,trans-2,2-dimethyl-3-(2-methyl-1-propenypcyclopropanecarboxylate], empenthrin[(RS)-1-ethynyl-2-methyl-2-pentenyl(1R)-cis,trans-2,2-dimethyl-3-(2-methyl-1-propenyl)cyclopropanecarboxylate], imiprothrin[2,5-dioxo-3-(2-propynypimidazolidin-1-ylmethyl(1R)-cis,trans-2,2-dimethyl-3-(2-methyl-1-propenyl) cyclopropanecarboxylate], d-furamethrin[5-(2-propynyl) furfuryl(1R)-cis,trans-2,2-dimethyl-3-(2-methyl-1-propenyl)cyclopropanecarboxylate] and 5-(2-propynyl) furfuryl 2,2,3,3-tetramethylcyclopropanecarboxylate; thiadiazine derivatives such as buprofezin[2-tert-butylimino-3-isopropyl-5-phenyl-1,3,5-thiadiazin-4-one]; nitroimidazolidine derivatives; nereistoxin derivatives such as cartap[S,S'-(2-dimethylaminotrimethyl)bis(thiocarbamate)], thiocyclam [N,N-dimethyl-1,2,3-trithian-5-ylamine] and bensultap[S,S'-2-dimethylaminotrimethylenedi(benzenethiosulfonate); N-cyanoamidine derivatives such as N-cyano-N'-methyl-N'-(6-chloro-3-pyridylmethyl)acetamidine; chlorinated hydrocarbon compounds such as endosulfan[6,7,8,9,10,10-hexachloro-1,5,5a,6,9,9a-hexahydro-6,9-methano-2,4,3-benzodioxathiepine oxide], γ-BHC[1,2,3,4,5,6-hexachlorocyclohexane] and dicofol[1,1-bis(4-chlorophenyl)-2,2,2-trichloroethanol]; benzoylphenylurea compounds such as chlorfluazuron[1-{3,5-dichloro-4-(3- chloro-5-trifluoromethylpyridin-2-yloxy)phenyl}-3-(2,6-difluorobenzoyl)urea], teflubenzuron[1-(3,5-dichloro-2,4-difluorophenyl)-3-(2,6-difluorobenzoyl)urea] and flufenoxuron [1-{4-(2-chloro-4-trifluoromethylphenoxy)-2-fluorophenyl}-3-(2,6-difluorobenzoyl)urea]; formamidine derivatives such as amitraz[N,N-{(methylimino)dimethylidine}-di-2,4-xylidine] and chlorodimeform[N'-(4-chloro-2-methylphenyl)-N,N-dimethylmethinimidamide]; thiourea derivatives such as diafenthiuron[N-(2,6-diisopropyl-4-phenoxyphenyl)-N'-t-butylcarbodiimide]; N-phenylpyrazole compounds; metoxadiazon[5-methoxy-3-(2-methoxyphenyl)-1,3,4-oxadiazol-2(3H)-one]; bromopropylate[isopropyl 4,4'-dibromobenzilate]; tetradifon[4-chlorophenyl 2,4,5-trichlorophenyl sulfone]; chinomethionat[S,S-6-methylquinoxaline-2,3-diyldithiocarbonate]; propargite[2-(4-tert-butylphenoxy)cyclohexylprop-2-yl sulfite]; fenbutatin oxide [bis{tris(2-methyl-2-phenylpropyptin}oxide]; hexythiazox [(4RS,5RS)-5-(4-chlorophenyl)-N-chlorohexyl-4-methyl-2-oxo-1,3-thiazolidine-3-carboxamide]; clofentezine[3,6-bis (2-chlorophenyl)-1,2,4,5-tetrazine]; pyridaben[2-tert-butyl-5-(4-tert-butylbenzylthio)-4-chloropyridazin-3(2H)-one]; fenpyroximate[tert-butyl(E)-4-[(1,3-dimethyl-5-phenoxypyrazol-4-yl)methyleneaminooxymethyl]benzoate]; tebufenpyrad[N-4-tert-butylbenzyl]-4-chloro-3-ethyl-1-methyl-5-pyrazolcarboxamide]; polynactin complex[tetranactin, dinactin, trinactin]; pyrimidifen[5-chloro-N-[2-{4-(2-ethoxyethyl)-2,3-dimethylphenoxy}ethyl]-6-ethylpyrimidine-4-amine]; milbemectin; abamectin, ivermectin; azadirachtin [AZAD]; 5-methyl[1,2,4]triazolo[3,4-b]benzothiazol; methyl 1-(butylcarbamoyl)benzimidazol-2-carbamate; 6-(3,5-dichloro-4-methylphenyl)-3(2H)-pyridazinone; 1-(4-chlorophenoxy)-3,3-dimethyl-1-(1H-1,2,4-triazol-1-yl)butanone; (E)-4-chloro-2-(trifluoromethyl)-N-[1-(imidazol-1-yl)-2-propoxyethylidene]aniline; 1-[N-propyl-N-[2-(2,4,6-trichlorophenoxy)ethyl]carbamoyl] imidazole; (E)-1-(4-chlorophenyl)-4,4-dimethyl-2-(1H-1,2, 4-triazol-1-yl)-1-penten-3-ol; 1-(4-chlorophenyl)-4,4-dimethyl-2-(1H-1,2,4-triazol-1-yl)pentan-3-ol; (E)-1-(2,4-dichlorophenyl)-4,4-dimethyl-2-(1H-1,2,4-triazol-1-yl) penten-3-ol; 1-(2,4-dichlorophenyl)-4,4-dimethyl-2-(1H-1, 2,4-triazol-1-yl)pentan-3-ol; 4-[3-(4-tert-butylphenyl)-2-methylpropyl]-2,6-dimethylmorpholine; 2-(2,4-dichlorophenyl)-1-(1H-1,2,4-triazol-1-yl)hexan-3-ol; O,O-diethyl O-2-quinoxalinyl phosphorothioate; O-(6-ethoxy-2-ethyl-4-pyromidinyl) O,O-dimethyl phosphorothioate; 2-diethylamino-5,6-dimethylpyrimidin-4-yl dimethylcarbamate; 4-(2,4-dichlorobenzoyl)-1,3-dimethyl-5-pyrazolyl p-toluenesulfonate; 4-amino-6-(1,1-dimethylethyl)-3-methylthio-1,2,4-triazin-5(4H)-one; 2-chloro-N-[(4-methoxy-6-methyl-1,3,5-triazin-2-yl)aminocarbonyl]benzenesulfonamide; 2-metboxycarbonyl-N-[(4,6-dimethoxypyrimidin-2-yl)aminocarbonyl]benzenesulfonamide; 2-methoxycarbonyl-N-[(4,6-dimethylpyrimidin-2-yl)aminocarbonyl]benzenesulfonamide; 2-methoxycarbonyl-N-[(4-methoxy-6-methyl-1,3,5-triazin-2-ynaminocarbonyl] benzenesulfonamide; 2-ethoxycarbonyl-N-[(4-chloro-6-methoxypyrimidin-2-yl)aminocarbonyl] benzenesulfonamide; 2-(2-chloroethoxy)-N-[(4-methoxy-6-methyl-1,3,5-triazin-2-yl)aminocarbonyl] benzenesulfonamide; 2-methoxycarbonyl-N-[(4,6-dimethoxypyrimidin-2-yl)aminocarbonyl] phenylmethanesulfonamide; 2-methoxycarbonyl-N-[(4-methoxy-6-methyl-1,3,5-triazin-2-yl) aminocarbonyl] thiophene-3-sulfonamide; 4-ethoxycarbonyl-N-[(4,6-dimethoxypyrimidin-2-yl)aminocarbonyl]-1-methylpyrazole-5-sulfonamide; 2-[4,5-dihydro-4-methyl-4-(1-methylethyl)-5-oxo-1H-3-quinolinecarboxylic acid; 2-[4, 5-dihydro-4-methyl-4-(1-methylethyl)-5-oxo-1H-imidazol-2-yl]-5-ethyl]-3-pyridinecarboxylic acid; methyl 6-(4-isopropyl-4-methyl-5-oxoimidazolin-2-yl)-m-toluate; methyl 2-(4-isopropyl-4-methyl-5-oxoimidazolin-2-yl)-p-toluate; 2-(4-isopropyl-4-methyl-5-oxoimidazolin-2-yl) nicotinic acid; N-(4-chlorophenyl)methyl-N-cyclopentyl-N'-phenylurea; (RS)-2-cyano-N—[(R)-1-(2,4-dichlorophenyl) ethyl]-3,3-dimethylbutyramide; N-(1,3-dihydro-1,1,3-trimethylisobenzofuran-4-yl)-5-chloro-1,3-dimethylpyrazole-4-carboxamide; N-[2,6-dibrobo-4-(trifluoromethoxy)phenyl]-2-methyl-4-(trifluoromethyl)-5-thiazolecarboxamide; 2,2-dichloro-N-[1-(4-chlorophel) ynethyl]3-methylcyclopropanecarboxamide; methyl(E)-2-2-6-(2-cyanophenoxy)pyrimidin-4-yloxy-phenyl-3-methoxyacrylate; 5-methyl-1,2,4-triazolo[3,4-b] benzothiazole; 3-allyloxy-1,2-benzisothiazole-1,1-dioxide; diisopropyl 1,3-dithiolan-2-ylidenemalonate and O,O-dipropyl O-4-methylthio phosphate.

The fertilizer in the present invention is a component containing various elements such as nitrogen, phosphorus, potassium, silicon, magnesium, calcium, manganese, boron, iron and the like to be applied to soil for imparting nutrients in plant cultivation, and examples thereof include nitrogen fertilizer components such as urea, ammonium nitrate, magnesium ammonium nitrate, ammonium chloride, ammonium sulfate, ammonium phosphate, sodium nitrate, calcium nitrate, potassium nitrate, lime nitrogen, formaldehyde-condensed urea (UF), acetaldehyde-condensed urea (CDU), isobutylaldehyde-condensed urea (IBDU) and guanyl urea (GU); phosphoric acid fertilizer components such as calcium superphosphate, triple superphosphate of lime, fused phosphorus, humus phosphorus, calcined phosphorus, sintered phosphorus, magnesiun superphosphate, ammonium polyphosphate, potassium metaphosphate, calcium metaphosphate, magnesium phosphate, ammonium sulfate phosphate, ammonium potassium phosphate nitrate, ammonium hydrochloride phosphate and the like; potassium fertilizer components such as potassium chloride, potassium sulfate, potassium sodium sulfate, potassium magnesia sulfate, potassium bicarbonate, potassium phosphate and the like; silic acid fertilizer components such as calcium silicate and the like; magnesia fertilizer components such as magnesium sulfate, magnesium chloride and the like; calcium fertilized components such as calcium oxide, calcium hydroxide, calcium carbonate and the like; manganese fertilizer components such as manganese sulfate, magnesia manganese sulfate, slag manganese and the like; boron fertilizer components such as boric acid, borate and the like; iron-containing fertilizer components such as steel slag and the like.

The bioactive substance-containing granule in the present invention may be a bioactive substance itself, or a material supporting a bioactive substance on a carrier. The bioactive substance-containing granule may contain various kinds of bioactive substances. The coated granule of the present invention may contain several bioactive substance-containing granules as an inner core simultaneously.

Examples of the carrier supporting a bioactive substance include kaolin minerals such as kaolinite and the like; mineral carriers such as montmorillonite, smectite, talc, agalmatolite, hydrous calcium silicate, calcium carbonate, zeolite, terra alba and the like; plant carriers such as cellulose, husk, starch, soybean powder and the like; water-soluble carries such as lactose, sucrose, dextrin, sodium chloride, sodium tripolyphosphate, and the like, and these carries can be used appropriately in combination.

In the present invention, mentioned as the bioactive substance-containing granule are pesticidal granules containing pesticidal active compounds such as insecticides, fungicides, herbicides, plant growth regulating agents, repellents and the like; granular fertilizers; pesticide-containing granular fertilizers containing fertilizers and pesticidal active ingredients, and the like.

As the coated granule of the present invention, the following embodiments are exemplified.

A coated granule obtained by coating a bioactive substance-containing granule with a urethane resin obtained by reacting 5 to 45 parts by weight of an aromatic polyisocyanate with an alcohol mixture containing 10 to 90 parts by weight of a polyesterpolyol having 15 wt % or more of an oxycarbonyl structure (—O—C(=O)—) part in the molecule and 1 to 30 parts by weight of a C4-C30 alkanol optionally substituted by one or more aryl groups.

A coated granule obtained by coating a bioactive substance-containing granule with a urethane resin obtained by reacting 5 to 45 parts by weight of an aromatic polyisocyanate with an alcohol mixture containing 25 to 80 parts by weight of the polyesterpolyol and 1 to 30 parts by weight of the alkanol.

A coated granule obtained by coating a bioactive substance-containing granule with a urethane resin obtained by reacting 5 to 45 parts by weight of an aromatic polyisocyanate with an alcohol mixture containing 10 to 90 parts by weight of a polycaprolactonepolyol and 1 to 30 parts by weight of the alkanol.

A coated granule obtained by coating a bioactive substance-containing granule with a urethane resin obtained by reacting 5 to 45 parts by weight of an aromatic polyisocyanate with an alcohol mixture containing 30 to 80 parts by weight of a polycaprolactonepolyol and 1 to 30 parts by weight of the alkanol.

A coated fertilizer granule obtained by coating a bioactive substance-containing granule with a urethane resin obtained by reacting 5 to 45 parts by weight of an aromatic polyisocyanate with an alcohol mixture containing 10 to 90 parts by weight of a polycaprolactonepolyol and 1 to 30 parts by weight of the alkanol.

A coated fertilizer granule obtained by coating a bioactive substance-containing granule with a urethane resin obtained by reacting 5 to 45 parts by weight of an aromatic polyisocyanate with an alcohol mixture containing 30 to 80 parts by weight of a polycaprolactonepolyol and 1 to 30 parts by weight of the alkanol.

The coated granule of the present invention can be produced by forming a coat made of the above-mentioned urethane resin around a bioactive substance-containing granule, and the coating method is not particularly restricted. There are mentioned, for example, (1) a method in which a solution or emulsion of a urethane resin prepared separately is sprayed around a bioactive substance-containing granule, then, a solvent is removed to attain coating; (2) a method in which an aromatic polyisocyanate and an alcohol mixture are added simultaneously or subsequently to a bioactive substance-containing granule, and on the surface of the bioactive substance-containing granule, a urethane resin is prepared to attain coating; and other methods.

The reaction temperature of the aromatic polyisocyanate with the alcohol mixture is usually 20 to 200° C., preferably 50 to 150° C.

Desired elution suppressing ability can be obtained even if the use amount of a resin used for coating is smaller providing a coat film in the coated granule of the present invention is uniform. Thus, it is preferable that the urethane resin is produced by reacting the aromatic polyisocyanate and the alcohol mixture under the condition without solvent on the surface of a granular material containing a bioactive substance.

Examples of the coated granule of the present invention used for applications in the agricultural field include coated granular fertilizers, coated pesticidal granules, solid pesticidal microcapsules, solid pesticidal microspheres and the like.

In obtaining the coated granule of the present invention, coating can be performed without using a solvent in resin molding, if an unhardened urethane resin has suitable flowability for a suitable period at temperatures in producing a urethane resin.

In the coated granule of the present invention, it is preferable that a urethane resin has a hydrophobic liquid compound having a boiling point of 100° C. or higher from the standpoint of bioactive substance elution suppressing ability. The hydrophobic liquid compound is usually immersed in a urethane resin or supported on its surface. The hydrophobic liquid compound is liquid at 20° C., and examples thereof include aliphatic hydrocarbons such as liquid paraffin, aromatic hydrocarbons such as phenylxylylethane, distyrylxylene, alkylbenzene (Solvesso 150; trade name of Exxon-Mobile Chemical), fatty acid ester compounds such as vegetable oils (e.g., soybean oil, cottonseed oil).

In the coated granule of the present invention, it is preferable that the above-mentioned hydrophobic liquid compound is contained in an amount of 0.01 to 5 wt % in the core granule material of the present invention, and in general, it is preferable that the hydrophobic liquid compound is added in an amount to an extent of slight presence of the hydrophobic liquid compound on the surface of the core granule.

The method for producing a coated granule of the present invention will be illustrated in more detail referring to a method for producing a coated granular fertilizer as an example.

Particles of a granular fertilizer are made into fluidizing condition or tumbling condition in an apparatus such as a jet flow apparatus, rolling pan, rolling drum and the like. The size of the particle is not particularly restricted, and usually 0.1 to 15 mm, and its shape is preferably sphere, and may also be other configuration such as cylinder and the like. The particles under fluidizing or tumbling condition are, if necessary, heated. Next, an unhardened urethane resin containing an aromatic polyisocyanate, an alcohol mixture and, a catalyst to be added if necessary, is added to the particle under fluidizing or tumbling condition. The addition method may be either a method of mixing components before quick addition, or a method of adding components separately. Thereafter, while maintaining the fluidizing or tumbling condition of the particles, the reaction of an isocyanate group in the aromatic polyisocyanate and a hydroxyl group in the alcohol mixture is progressed, thereby, the surface of the particle is coated with a urethane resin. It is preferable to control the amount of the urethane resin to be added so that the thickness of a coat film formed in this one operation is usually 1 to 20 μm. Further, when larger thickness of a coat film is necessary, the thickness of a urethane resin coat film can be increased by repeating the above-mentioned operation.

In the coated granule of the present invention, the thickness of an urethane resin coat film is usually 1 to 1000 μm, pref erably 8 to 400 μm, and the amount thereof is usually 1 to 20 wt % (based on coated granular material of the present invention), preferably 3 to 16 wt %.

The particle size of the coated granule of the present invention is usually in the range of 0.1 to 15 mm.

isocyanate was added, mixed quickly and drawn into a sheet using an applicator set at a thickness of about 125 μm (for degradation test). The drawn resin was allowed to stand at 70° C. for 3 hours to cause hardening, obtaining urethane resin films (A) to (F) and (a).

TABLE 1

|  | Name of Compound | A | B | C | D |
|---|---|---|---|---|---|
| Polyisocyanate | Polymeric MDI (NCO equivalent: 136) | 25.0 | 25.0 | 25.0 | 25.0 |
| Polyesterpolyol | Polycaprolactonediol A (OH equivalent: 265) |  |  |  | 1.3 |
|  | Polycaprolactonediol B (OH equivalent: 492) | 63.3 | 64.6 | 65.9 | 65.0 |
|  | Polycaprolactonediol C (OH equivalent: 1002) | 8.2 | 5.6 | 3.0 |  |
| Alkanol | 1-Butanol (Mw: 74) | 3.5 |  |  |  |
|  | 1-Hexanol (Mw: 102) |  | 4.8 |  |  |
|  | 1-Octanol (Mw: 130) |  |  | 6.1 |  |
|  | 1-Dodecanol (Mw: 183) |  |  |  | 8.7 |
| Catalyst | 2,4,6-Tris(dimethylaminomethyl)phenol | 0.05 | 0.05 | 0.05 | 0.05 |
|  | Total Amount (wt %) | 100.05 | 100.05 | 100.05 | 100.05 |

TABLE 2

|  | Name of Compound | E | F | a |
|---|---|---|---|---|
| Polyisocyanate | Polymeric MDI (NCO equivalent: 136) | 25.0 | 25.0 | 25.0 |
| Polyesterpolyol | Polycaprolactonediol A (OH equivalent: 265) | 7.6 |  | 18.1 |
|  | Polycaprolactonediol B (OH equivalent: 492) | 53.3 | 64.9 | 56.9 |
|  | Polycaprolactonediol C (OH equivalent: 1002) |  | 5.0 |  |
| Alkanol | 2-Octyl-1-dodecanol (Mw: 301) | 14.1 |  |  |
|  | Benzyl alcohol (Mw: 108) |  | 5.1 |  |
| Catalyst | 2,4,6-Tris(dimethylaminomethyl) phenol | 0.05 | 0.05 | 0.05 |
|  | Total Amount (wt %) | 100.05 | 100.05 | 100.05 |

When a urethane resin has a hydrophobic liquid compound, the coated granular fertilizer of the present invention can be produced by a method in which a hydrophobic liquid compound is added to the granular fertilizer simultaneously with an unhardened urethane resin, a method in which a hydrophobic liquid compound is added to the granular fertilizer before coating with a urethane resin, a method in which a hydrophobic liquid compound is added, after coating with a urethane resin, to the granular fertilizer coated with a urethane resin, and the like, in the above-mentioned method for producing a coated granular fertilizer, and preferably, produced by a method in which a hydrophobic liquid compound is added to the granular fertilizer before coating with a urethane resin.

EXAMPLES

The present invention will be illustrated in more detailed by production examples and test examples mentioned later, but the present invention is not limited to only examples.

Reference Example

Production of Urethane Resin Film

A urethane resin film was produced under the following conditions.

Polyesterpolyols and alkanol described in Tables 1 and 2 and 2,4,6-tris(dimethylaminomethyl)phenol (catalyst) were mixed uniformly at about 50° C., and then, an aromatic poly- In Tables 1 and 2 described above, Polymeric MDI (Sumidur 44V-10, manufactured by Sumika Beyer Urethane K.K.), polycaprolactonediol A (Placcel 205, manufactured by Daicel Chemical Industries, Ltd.), polycaprolactonediol B (Placcel 210, manufactured by Daicel Chemical Industries, Ltd.), polycaprolactonediol C (Placcel 220, manufactured by Daicel Chemical Industries, Ltd.), 1-butanol (manufactured by Wako Pure Chemical Industries, Ltd.), 1-hexanol (manufactured by Wako Pure Chemical Industries, Ltd.), 1-octanol (manufactured by Wako Pure Chemical Industries, Ltd.), 1-dodecanol (manufactured by Wako Pure Chemical Industries, Ltd.), 2-octyl-1-dodecanol (manufactured by Wako Pure Chemical Industries, Ltd.), benzyl alcohol (manufactured by Wako Pure Chemical Industries, Ltd.) and 2,4,6-tris(dimethylaminomethyl)phenol (TAP, manufactured by Kayaku Akzo Corporation) were used.

Test Example 1

Degradation of Urethane Resin Film in Soil

Films (A) to (F) and (a) were cut into a size of 20 mm×20 mm and buried in soil obtained from the field in Hyogo prefecture (clay loam having a moisture content of 25.9%) and preserved at 28° C. During preservation, moisture was refilled appropriately in the soil and kept constant. Three months after, the films were recovered, washed with water, and dried, then, reduction rate in weight of the film was measured. The results are given in Table 3.

Test Example 2

Film Permeability Test of Urethane Resin Film

Using a film permeability experiment apparatus (manufactured by VIDREX, for flat plate film), film permeability of urea in films (A), (B), (C) and (D) were measured. 53 ml of a 72% aqueous urea solution was charged in one cell of the film permeability experiment apparatus, and 53 ml of ion-exchanged water was charged in another cell (acceptor side), and the film was sandwiched between these cells and kept at 50° C. During the test, the solution in each cell was being stirred. After given days, the aqueous solution was sampled from the acceptor side, and the amount of urea permeated through the film was measured. Based on degrees of film permeation calculated by the following calculation formula, relative degrees of film permeation of films of the urethane resin, hypothesizing the degree of film permeation of film (a) is 1, are shown in Table 3.

[degree of film permeation (mol/(hr×m))]=[urea permeation molar quantity per unit area (mol/(hr× m$^2$))]×[film thickness (m)]

TABLE 3

| Film | Reduction in soil (%) | Relative degree of permeation |
|---|---|---|
| A | 7.4 | 0.68 |
| B | 7.0 | 0.67 |
| C | 5.8 | 0.20 |
| D | 10.7 | 0.59 |
| E | 5.3 | — |
| F | 6.0 | — |

Production Example 1

Under conditions described later, coated granular fertilizers were produced by coating granular urea (large granular urea, particle size: about 3 mm, number of granule per gram: 60) with urethane resins of raw material composition (C) described in Table 1.

In a rotary bath, 1000 parts by weight of granular urea was made into tumbling condition, and the granular urea was heated up to about 70° C. by hot air. Next, 15 parts by weight of liquid paraffin was added and tumbling thereof was continued for 10 minutes. Further, 5 parts by weight of an unhardened urethane resin having the composition described in Table 1 was added. The unhardened urethane resin was prepared just before the use by mixing the polyesterpolyol, alkanol and 2,4,6-tris(dimethylaminomethyl)phenol (catalyst) uniformly at about 70° C., adding the aromatic polyisocyanate thereto and mixing them quickly. After the addition of the unhardened urethane resin, the mixture was kept the tumbling condition under heating for 3 minutes or more. Further, addition of the unhardened urethane resin and keeping of the tumbling condition under heating were repeated until the total amount of the unhardened urethane resin added reached 100 parts by weight. Thereafter, the mixture was cooled down to around room temperature, to obtain coated granular urea (C).

Production Example 2

Eight (8) parts by weight of N-(1,1,3-trimethyl-2-oxa-4-indanyl)-5-chloro-1,3-dimethylpyrazole-4-carboxamide, 1.6 parts by weight of hydrous silicon dioxide (TOKUSEAL GU-N, manufactured by Tokuyama Soda Co., Ltd.) and 8 parts by weight of bentonite (BENTONITE FUJI, manufactured by Hojun Kogyo K.K.) were mixed sufficiently, then, pulverized by a jet mill. 17.6 parts by weight of the crushed material obtained above, 4.5 parts by weight of a pulverized mixture of 3.15 parts by weight of [(E)-1-(2-chloro-1,3-thiazol-4-ylmethyl)-3-methyl-2-nitroguanidine] and 1.35 parts by weight of clay (SHOKOSAN Clay S, manufactured by Shokosan Kogyosho K.K.), 3 parts by weight of a mixture of 2.5 parts by weight of polyvinyl alcohol (GOHSENOL GL-05 (manufactured by Nippon Synthetic Chemical Industry Co., Ltd.) and 0.5 parts by weight of PVA 217S (manufactured by Kuraray Co., Ltd.), 12 parts by weight of bentonite (BENTONITE FUJI, manufactured by Hojun Kogyo K.K.), 2 parts by weight of polyoxyethylene styryl phenyl ether (SOLPOL T-20, manufactured by Toho Chemical Industry Co., Ltd.) and 51.9 parts by weight of a calcium carbonate powder (TANCAL NN200, manufactured by Nitto Funka Kogyo K.K.) were mixed sufficiently in a juice mixer, to obtain a powder mixture. To the powder mixture was added 15 parts by weight of water containing 12.0 parts by weight of granulated sugar and 1.5 parts by weight of urea dissolved therein, and the mixture was kneaded sufficiently. The resultant kneaded material was granulated by a compact extrusion granulation machine equipped with a 0.9 mmφ screen, and the particle size was regulated, then, the granules were dried at 60° C. for 15 minutes to obtain an inner core in the form of cylinder (granule size: 1400 to 850 μm, average diameter of cross-section: 0.9 mmφ).

In a rotary bath, 100 parts by weight of the above-mentioned inner core was made into tumbling condition, and the inner core was heated up to about 70° C. by hot air. Next, 0.25 parts by weight of an unhardened urethane resin (D) described in Table 1 was added. The unhardened urethane resin (D) was prepared by mixing the polyesterpolyol, alkanol and 4,6-tris(dimethylaminomethyl)phenol (catalyst) described in Table 1 uniformly at about 50° C., adding the aromatic polyisocyanate and mixing quickly just before the use. After addition of the unhardened urethane resin, the tumbling condition was kept under heating for 3 minutes or more. Further, addition of the unhardened urethane resin and keeping of the tumbling condition under heating for 3 minutes were repeated until the total amount of the unhardened urethane resin added reached 4.00 parts by weight. Thereafter, the mixture was cooled down to around room temperature, to obtain coated pesticidal granule.

Test Example 3

200 mg of the coated pesticidal granule obtained in Production Example 2 was placed in a 100 ml glass tube, 100 ml of ion-exchanged water was added thereto and the mixture was allowed to stand still at 25° C. After one week, a small amount of the mixture was sampled, and the content of N-(1,1,3-trimethyl-2-oxa-4-indanyl)-5-chloro-1,3-dimethylpyrazole-4-carboxamide eluted from the coated pesticidal granule was measured. The elution ratio was 73%.

INDUSTRIAL APPLICABILITY

In the coated granule containing a bioactive substance, a resin forming a coat shows degradability in soil, and there is controllability of suitable elution of the bioactive substance.

The invention claimed is:

1. A coated granule obtained by coating a bioactive substance-containing granule with a urethane resin obtained by reaction of an aromatic polyisocyanate with an alcohol mixture comprising a polyesterpolyol having 15 wt % or more of an oxycarbonyl structure (—O—C(=O)—) part in the molecule and a C4-C30 alkanol optionally substituted by one or more aryl groups, wherein the molar ratio of the polyesterpolyol to the alkanol is 1:1 to 100:1.

2. The coated granule according to claim 1, wherein the amount of the polyesterpolyol is 20 to 80 parts by weight based on 100 parts by weight of the total amount of the aromatic polyisocyanate and the alcohol mixture.

3. The coated granule according to claim 1, wherein the polyesterpolyol is polycaprolactonepolyol.

4. The coated granule according to claim 3, wherein the amount of the polycaprolactonepolyol is 30 to 80 parts by weight based on 100 parts by weight of the total amount of the aromatic polyisocyanate and the alcohol mixture.

5. The coated granule according to claim 1, wherein the amount of the C4-C30 alkanol optionally substituted by one or more aryl groups is 1 to 30 parts by weight based on 100 parts by weight of the total amount of the aromatic polyisocyanate and the alcohol mixture.

6. The coated granule described in claim 1, wherein the C4-C30 alkanol optionally substituted by one or more aryl groups is a C4-C18 n-alkan-1-ol.

7. The coated granule according to claim 1, wherein the C4-C30 alkanol optionally substituted by one or more aryl groups is 1-butanol, 1-hexanol, 1-octanol, 1-dodecanol, 2-octyl-1-dodecanol, benzyl alcohol or a mixture thereof.

8. The coated granule according to claim 1, wherein the amount of the aromatic polyisocyanate is 5 to 45 parts by weight based on 100 parts by weight of the total amount of the aromatic polyisocyanate and the alcohol mixture.

9. The coated granule according to claim 1, wherein the aromatic polyisocyanate is 4,4'-diphenylmethanediisocyanate or polymethylenepolyphenyl polyisocyanate.

10. The coated granule according to claim 1, wherein the bioactive substance is a fertilizer.

11. The coated granule according to claim 1, wherein the bioactive substance is a pesticide.

* * * * *